C. F. JENKINS.
MOTION PICTURE APPARATUS.
APPLICATION FILED MAY 10, 1911.

1,010,370.

Patented Nov. 28, 1911.

WITNESSES:
A. W. Jenkins
R. Craig Greene

INVENTOR.
C. Francis Jenkins
BY
Wallace Greene,
ATTORNEY.

UNITED STATES PATENT OFFICE.

CHARLES FRANCIS JENKINS, OF WASHINGTON, DISTRICT OF COLUMBIA.

MOTION-PICTURE APPARATUS.

1,010,370. Specification of Letters Patent. Patented Nov. 28, 1911.

Application filed May 10, 1911. Serial No. 626,395.

*To all whom it may concern:*

Be it known that I, CHARLES FRANCIS JENKINS, a citizen of the United States, residing at Washington, in the District of Columbia, have invented certain new and useful Improvements in Motion-Picture Apparatus, of which the following is a specification, reference being had therein to the accompanying drawing.

This invention relates to moving picture apparatus and especially to providing means for readily distinguishing right eye and left eye picture elements of a film intended for showing stereoscopically objects in motion and for showing objects in approximately their natural colors. Whether in stereoscopic or color work of certain kinds, it is indispensable that the element pictures on the film should be presented to the eye in proper sequence in order to secure the desired results in the moving picture; and long and fragile films are frequently torn or injured and must be spliced. But as the elemental pictures or picture elements which are near each other on the film do not so differ that they can be readily distinguished, it has not usually been possible to splice the broken film correctly without much delay.

The object of this invention is to provide for supplying all pictures having a common characteristic, e. g. all right eye pictures, with a permanent mark by which each may be instantly recognized as belonging to its class. To this end the camera with which the negatives are taken is made to supply automatically to each picture a mark which will properly indicate its class and which will also appear in all positives made from that negative.

For illustration I have chosen a camera attachment adapted for marking three-color picture elements which succeed each other repeatedly in the same order on the film.

Figure 1:
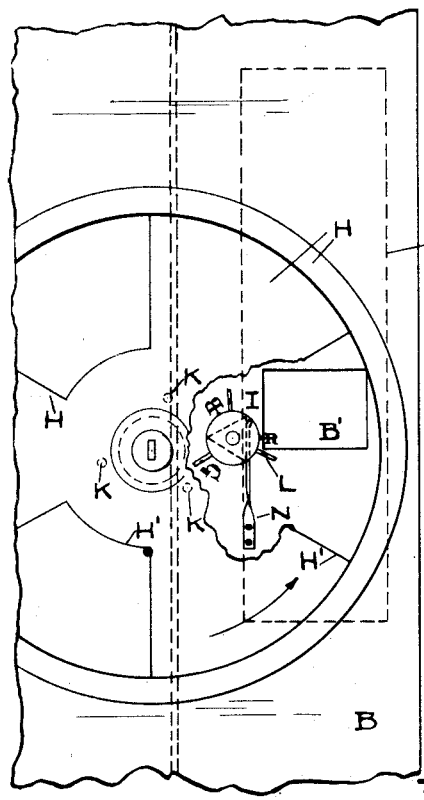
Figure 2:
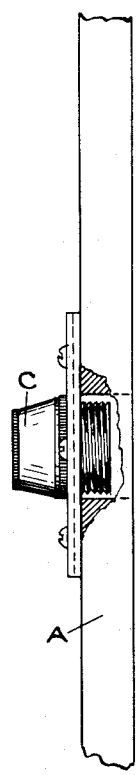
Figure 3:
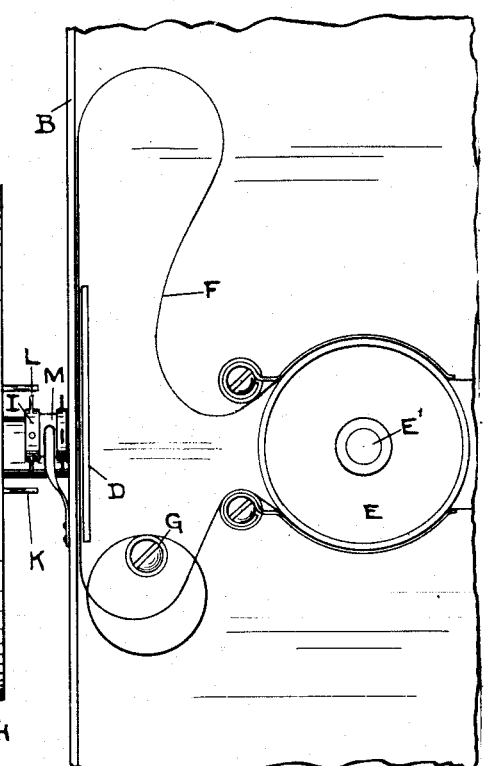
Figure 3:
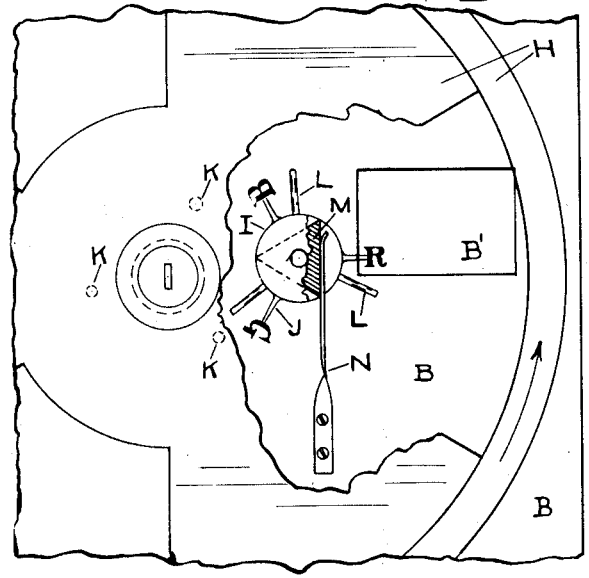
Figure 4:
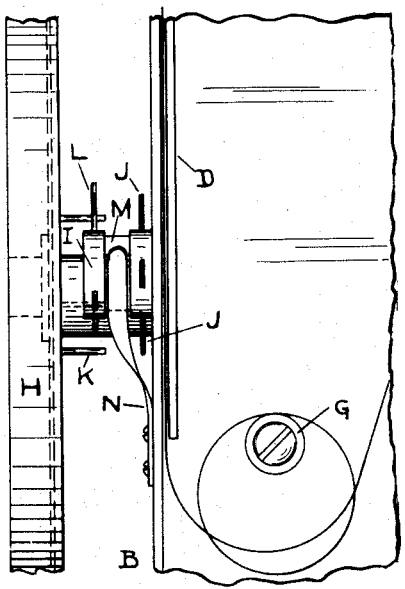

In the accompanying drawings, Figure 1 is a front view of a portion of a camera provided with film marking devices. Fig. 2 is a side elevation of the same apparatus. Fig. 3 is a view similar to Fig. 1 showing many of the same parts. Fig. 4 is a view similar to Fig. 2, some parts there shown being omitted.

In these views, A represents a portion of the front of a camera box or casing, B a partition within the camera, provided with an exposure opening B', C a lens the axis of which is in alinement with that opening, D a film guide upon said partition at said opening, E a sprocket drum mounted upon a shaft E' to feed a film strip F to the guide and withdraw from the guide that portion which has been exposed, G a crank pin for moving the film intermittently past the exposure point, and H a shutter having three openings H' at equal angular distances from each other. All these parts are driven, in the usual way, and none has in itself any novelty herein claimed.

Upon the partition B, at one side of its exposure opening is revolubly mounted a small hub I provided with three equidistant arms J, near the partition, which bear, respectively, letters R G B indicative of the colors red, green and blue, and the parts are so arranged that by rotation of the hub the letters may be brought in succession very near the partition and directly over one corner portion of the exposure opening therein. The hub is intermittently rotated by equidistant pins K fixed to the shutter in position to strike, respectively, as the shutter rotates, arms L projecting from the hub, and the relative arrangement of the pins arms, letters and shutter openings is such that one of the letters will be thus brought over the exposure opening and allowed to remain there while light is passing through the corresponding shutter opening. To hold the letters immovably in exact position, a portion M of the hub is made of such shape that its cross section is an equilateral triangle and a light spring U is arranged to press upon one of these plane faces while the hub is at rest. The hub is thus brought to rest and held in precisely the desired position.

From the construction it follows that the film strip has imprinted upon each of its picture bearing segments the proper letter to distinguish the class to which that particular element belongs and, of course, that this designating mark will appear upon all positive film printed therefrom. There is then no difficulty whatever in so splicing broken film as to bring the picture elements into proper sequence.

It is evident that where the number of colors used is varied, or where merely right eye and left eye elements are used, the camlike portion of the hub will be correspondingly changed.

What I claim is:

1. The combination with a camera for producing moving picture film, of automatic means for moving a series designating character into position to be printed upon the corresponding picture bearing segment of the film and moving this character out of such position before it can be printed on the succeeding picture bearing segment.

2. The combination with a camera wherein successive portions of a film strip are exposed in rapid succession, of automatic means for placing before the exposed portion of film during exposure a picture-designating character and for moving this character away before the next succeeding exposure.

In testimony whereof I affix my signature in presence of two witnesses.

CHARLES FRANCIS JENKINS.

Witnesses:
JAMES L. CRAWFORD,
R. CRAIG GREENE.